(12) United States Patent
Chang

(10) Patent No.: US 7,247,835 B2
(45) Date of Patent: Jul. 24, 2007

(54) OPTICAL NAVIGATION DEVICE, AND METHOD FOR MANUFACTURING SAME

(76) Inventor: Keng Yeam Chang, P.O. Box 1920, Denver, CO (US) 80201-1920

( * ) Notice: Subject to any disclaimer, the term of this patent is extended or adjusted under 35 U.S.C. 154(b) by 31 days.

(21) Appl. No.: 11/314,617

(22) Filed: Dec. 20, 2005

(65) Prior Publication Data
US 2007/0138378 A1    Jun. 21, 2007

(51) Int. Cl.
*H01J 40/14*    (2006.01)
*G09G 5/08*    (2006.01)

(52) U.S. Cl. ................ 250/221; 250/214.1; 250/208.1; 345/163; 345/166

(58) Field of Classification Search ................ 250/221, 250/222.1, 214.1, 208.1; 345/157–158, 163–166
See application file for complete search history.

(56) References Cited

U.S. PATENT DOCUMENTS

| | | | |
|---|---|---|---|
| 4,647,771 A * | 3/1987 | Kato | ................ 250/237 R |
| 6,741,335 B2 | 5/2004 | Kinrot et al. | |
| 2003/0142288 A1 | 7/2003 | Kinrot et al. | |
| 2004/0212593 A1 | 10/2004 | Wang et al. | |
| 2005/0024336 A1 | 2/2005 | Xie et al. | |
| 2005/0024623 A1 | 2/2005 | Xie et al. | |
| 2005/0094154 A1 | 5/2005 | Baney et al. | |

OTHER PUBLICATIONS

Espinasse et al.; "Detection Reflections"; SPIE's oemagazine, Mar. 2004; pp. 24-26.

* cited by examiner

*Primary Examiner*—Kevin Pyo

(57) ABSTRACT

An optical navigation sensor receives light that is produced by a light source and reflected from a surface. The optical navigation sensor has a silicon substrate having a plurality of photo-sensing regions, each of which receives a portion of the reflected light, and each of which provides a pixel of navigation information. At least one layer of material is deposited on the photo-sensing regions of the silicon substrate during a silicon wafer fabrication process. Each layer has a thickness that causes it to serve as an anti-reflection coating and reduce a percentage of light that is reflected away from the photo-sensing regions of the silicon substrate. A circuit biases each of the photo-sensing regions with a current, the current providing a given responsivity, and the current being less than a current that would be required to provide the given responsivity absent the at least one layer of material.

29 Claims, 8 Drawing Sheets

OPTICAL NAVIGATION DEVICE, AND METHOD FOR MANUFACTURING SAME

BACKGROUND

The optical navigation sensors used in optical mice detect the changing patterns of light that are reflected from microscopic textural features of the surface over which they navigate. The responsivity of a navigation sensor plays an important part in how well a mouse tracks the features of a surface. This is especially so in the case of surfaces having few surface features, such as glass surfaces.

Typically, the responsivity of an optical navigation sensor is adjusted by changing the doping level of a phototransistor's emitter, or by changing the width of a phototransistor's base, to increase the phototransistor's beta value (i.e., current gain). However, there is a limitation to increasing the beta value of a phototransistor, as its doping level or width cannot be changed beyond certain "threshold" values, beyond which the fundamental transistor action is adversely affected. For instance, the base width could not be narrowed too greatly such that it affects the matching among the pixels. In addition, the gain improvement rendered by this method is limited by shot noise. In other words, even though a desired current gain may be attainable, the signal-to-noise ratio (SNR) may remain the same or become worse in that the noise floor may increase inadvertently with the increase of the beta/current gain.

SUMMARY OF THE INVENTION

In one embodiment, an optical navigation device comprises a light source and an optical navigation sensor. The light source produces light for illuminating a surface. The optical navigation sensor receives light reflected from the surface. The optical navigation sensor has a silicon substrate having a plurality of photo-sensing regions, each of which receives a portion of the light reflected from the surface, and each of which provides a pixel of navigation information. At least one layer of material is deposited on the photo-sensing regions of the silicon substrate during a silicon wafer fabrication process, and each of the at least one layer of material has a thickness that causes the layer of material to serve as an anti-reflection coating and reduce a percentage of light that is reflected away from the photo-sensing regions of the silicon substrate to less than 30%. The optical navigation sensor also comprises a circuit to bias each of its photo-sensing regions with a current. The current provides a given responsivity, and is less than a current that would be required to provide the given responsivity absent the at least one layer of material.

In another embodiment, a method for manufacturing an optical navigation device comprises providing a silicon wafer having a plurality of optical navigation sensors formed thereon, wherein each of the optical navigation sensors has a plurality of photo-sensing regions, and wherein each of the photo-sensing regions provides a pixel of navigation information. At least one layer of material is deposited on the photo-sensing regions of the silicon substrate during a silicon wafer fabrication process. Each of the at least one layer of material has a thickness that causes the layer of material to serve as an anti-reflection coating and reduce a percentage of light that is reflected away from the photo-sensing regions of the silicon substrate to less than 30%. Each of the optical navigation sensors is then separated from the wafer. A light source and one of the optical navigation sensors is mounted in an optical navigation device, with the light source and the one of the optical navigation sensors being positioned to enable light produced by the light source to be reflected from a surface and received by the one of the optical navigation sensors. The one of the optical navigation sensors is coupled to a circuit to bias each of its photo-sensing regions with a current, the current providing a given responsivity, and the current being less than a current that would be required to provide the given responsivity absent the at least one layer of material.

Other embodiments are also disclosed.

BRIEF DESCRIPTION OF THE DRAWINGS

Illustrative embodiments of the invention are illustrated in the drawings, in which.

DETAILED DESCRIPTION

Figure 1:
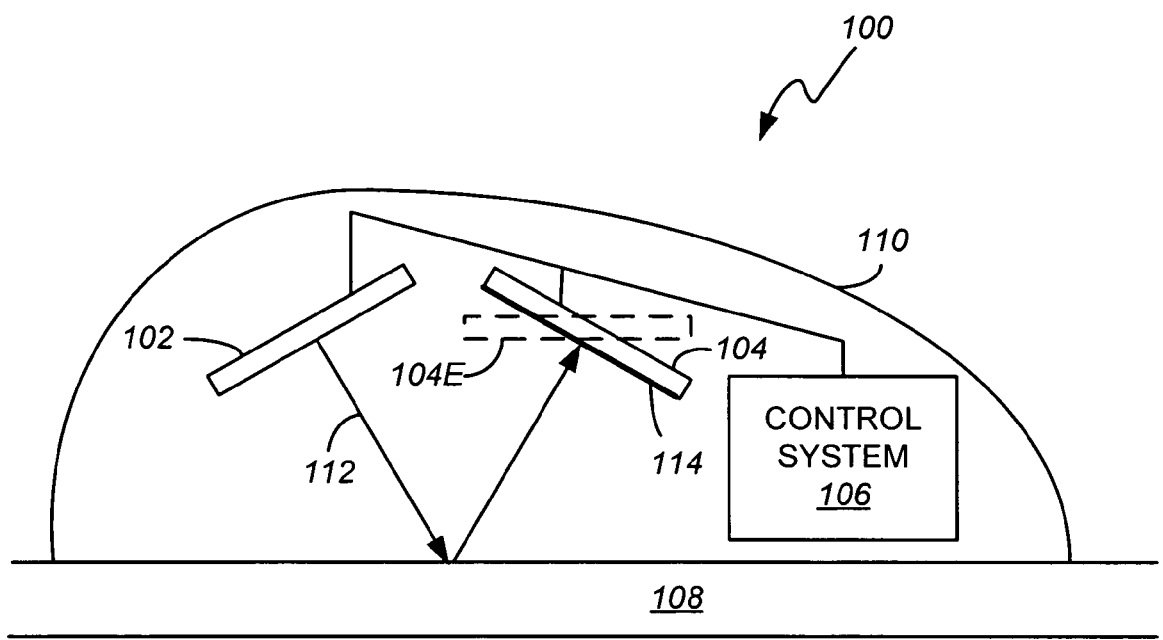
FIG. 1 illustrates an exemplary optical navigation device having an optical navigation sensor.

The optical navigation sensors used in optical mice detect the changing patterns of light that are reflected from microscopic textural features of the surface over which they navigate. The responsivity (i.e., photo-sensitivity) of a navigation sensor plays an important part in how well a mouse tracks the features of a surface. This is especially so in the case of surfaces having few surface features, such as glass surfaces.

Typically, the responsivity (amperes/watts) of an optical navigation sensor is defined as the ratio of 1) photocurrent (in amperes) generated by the sensor's photo-sensing regions (i.e., reverse biased p-n junctions or base-collector junction depletion regions defining a plurality of "pixels" of the sensor) to 2) the incident optical power (in watts). Theoretically, the responsivity is dependent on efficiencies of electron-hole pair generation and carrier collection at the photo-sensing regions, as well as light transmission efficiency into the photo-sensing regions. While the electrical aspect of the responsivity is largely dependent on the sensor's material and structure, the light transmission efficiency may be improved by depositing an anti-reflection coating on the sensor's photo-sensing regions.

When incident light impinges upon the surfaces of a sensor's photo-sensing regions, a portion of the light is reflected, and the rest is transmitted and can be used for detecting movement. The relationship between incident (I), reflected (R) and transmitted (T) light intensities is given by the equation: T=I−R. In the absence of an anti-reflection coating (ARC), a sensor's photo-sensing regions are sometimes covered by thick oxide and nitride films that serve as a passivation layer. Such thick films may lead to reflection losses on the order of 50% (T~0.5). In contrast, the reflection loss of an unpassivated photo-sensing region can be on the order of 30% (T~0.7). However, even though the responsivity of an unpassivated photo-sensing region may be better, the use of a passivation layer is often desirable, or necessary, for its electrical benefits.

Compared to increasing a phototransistor's internal gain (i.e., beta) the anti-reflection coatings described below tend not to increase a sensor's random noise floor, and thereby serve to improve the overall signal-noise-ratio (SNR) of a sensor's phototransistors.

The anti-reflection coatings described below also tend to minimize the reflection loss at the wavelength of the light source, which in turn optimizes light transmission and enables a larger number of photons to reach the sensor's photo-sensing regions. This increase in the number of photons has a direct effect on improving the responsivity of the sensor.

In several of the disclosed embodiments, there are provided cost-effective anti-reflection coatings to improve the responsivity of an optical navigation sensor used in an optical mouse. In one embodiment, this is achieved by applying a single layer anti-reflection coating (SL-ARC) on top of the photo-sensing regions of the mouse's optical navigation sensor. In another embodiment, this is achieved applying a double layer anti-reflection coating (DL-ARC) on top of the photo-sensing regions of the mouse's optical navigation sensor. The anti-reflection coatings (ARCs) are able to reduce the light reflection loss off the surface of the sensor's photo-sensor regions, which in turn enhances light transmission into the photo-sensing regions of the sensor.

FIG. 1 illustrates an exemplary optical navigation device 100, such as a mouse, comprising a light source 102 and an optical navigation sensor 104. By way of example, the light source 102 may comprise a light emitting diode (LED) or laser diode (such as a vertical cavity surface emitting laser (VCSEL)).

Figure 2:
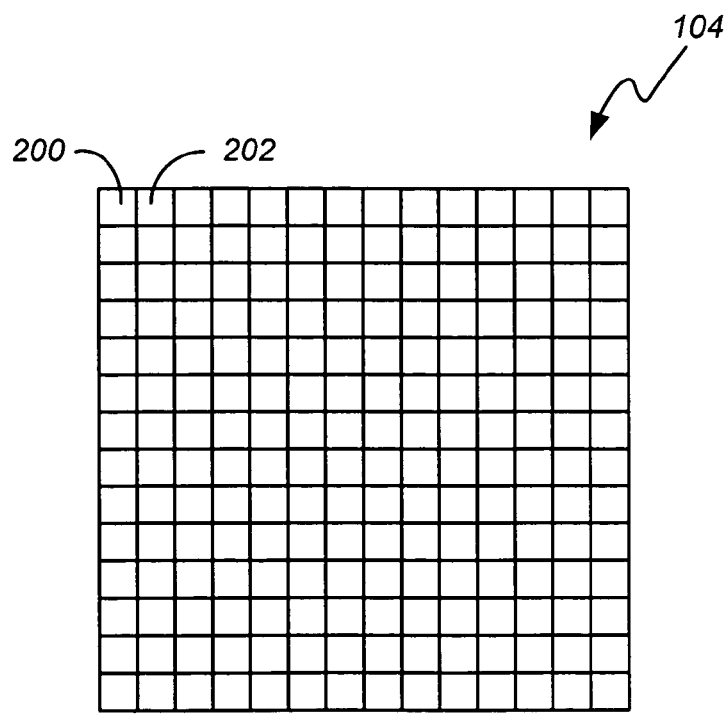
FIG. 2 illustrates an exemplary plan view of the photo-sensing regions of the optical navigation sensor shown in FIG. 1.

As shown in FIG. 2, the underside of the optical navigation sensor 104 may have a plurality of photo-sensing regions (e.g., 200, 202), each of which is formed on a silicon substrate of the sensor 104, and each of which provides a pixel of navigation information to a control system 106 (FIG. 1).

Referring back to FIG. 1, the light source 102 and the optical navigation sensor 104 may be mounted at various angles with respect to one another, and with respect to a surface 108. As shown, the light source 102 and the optical navigation sensor 104 may be mounted within a housing 110. By way of example, an alternate mounting angle of the optical navigation sensor 104 is illustrated by dashed box 104E.

In operation, the light source 102 illuminates the surface 108 with a beam of light 112. Depending on the type of the quality of the surface 108, some or all of the light 112 is reflected from the surface 108 to the optical navigation sensor 104. Each of the photo-sensing regions 200, 202 then provides a pixel of navigation information to the control system 106.

As will be described in more detail later in this description, at least one layer of material 114 may be deposited on the photo-sensing regions 200, 202 of the silicon substrate of the sensor 104 during a silicon wafer fabrication process. Each of the at least one layer of material 114 has a thickness that causes the layer of material 114 to serve as an anti-reflection coating and reduce (to less than 30%) a percentage of light 112 that is reflected away from the photo-sensing regions 200, 202 of the silicon substrate. A circuit of the optical navigation sensor 104 is then able to bias each of the photo-sensing regions 200, 202 with a current that provides a given responsivity for the sensor 104. As a result of the material 114 providing an anti-reflection coating, the current provided by the circuit is less than a current that would be required to provide the same responsivity absent the at least one layer of material 114. This can result in significant power savings. Furthermore, it can enable an increase in resolution of the photo-sensing regions 200, 202 of the optical navigation sensor 104, while still maintaining the same responsivity as a lower-resolution sensor that is not provided with the at least one layer of material.

In one embodiment of the device 100, there is provided an optical navigation sensor 104 with a single layer of silicon nitride forming an anti-reflection coating. The thickness of the single layer of silicon nitride is preferably selected so as to provide a minimum reflection loss of less than 30%, and even more preferably, provide a minimum reflection loss of less than 5%. If the light source 102 is an LED, the wavelength of emitted light is about 650 nm, and the light with respect to the photo-sensing regions 200, 202 has a normal incidence angle of about 0°, then a minimum reflection loss of less than 5% may be obtained when the thickness of the single layer of silicon nitride is about 64 nm to about 96 nm multiplied by an odd integer.

In another embodiment, there is provided an optical navigation sensor 104 with a single layer of silicon dioxide forming an anti-reflection coating. The thickness of the single layer of silicon nitride is preferably selected so as to provide a minimum reflection loss of less than 30%, and even more preferably, a minimum reflection loss of less than 12%. If the light source 102 is an LED, the wavelength of emitted light is about 650 nm, and the light with respect to the photo-sensing regions 200, 202 has a normal incidence angle of about 0°, then a minimum reflection loss of less than 12% may be obtained when the thickness of the single layer of silicon nitride is about 88.8 nm to about 133.2 nm multiplied by an odd integer.

In yet another embodiment, there is provided an optical navigation sensor 104 having deposited thereon a first layer of silicon dioxide and a second layer of silicon nitride, wherein the thicknesses of the first layer and the second layer together form an anti-reflection coating with a minimum reflection loss of less than 30%.

Figure 3:
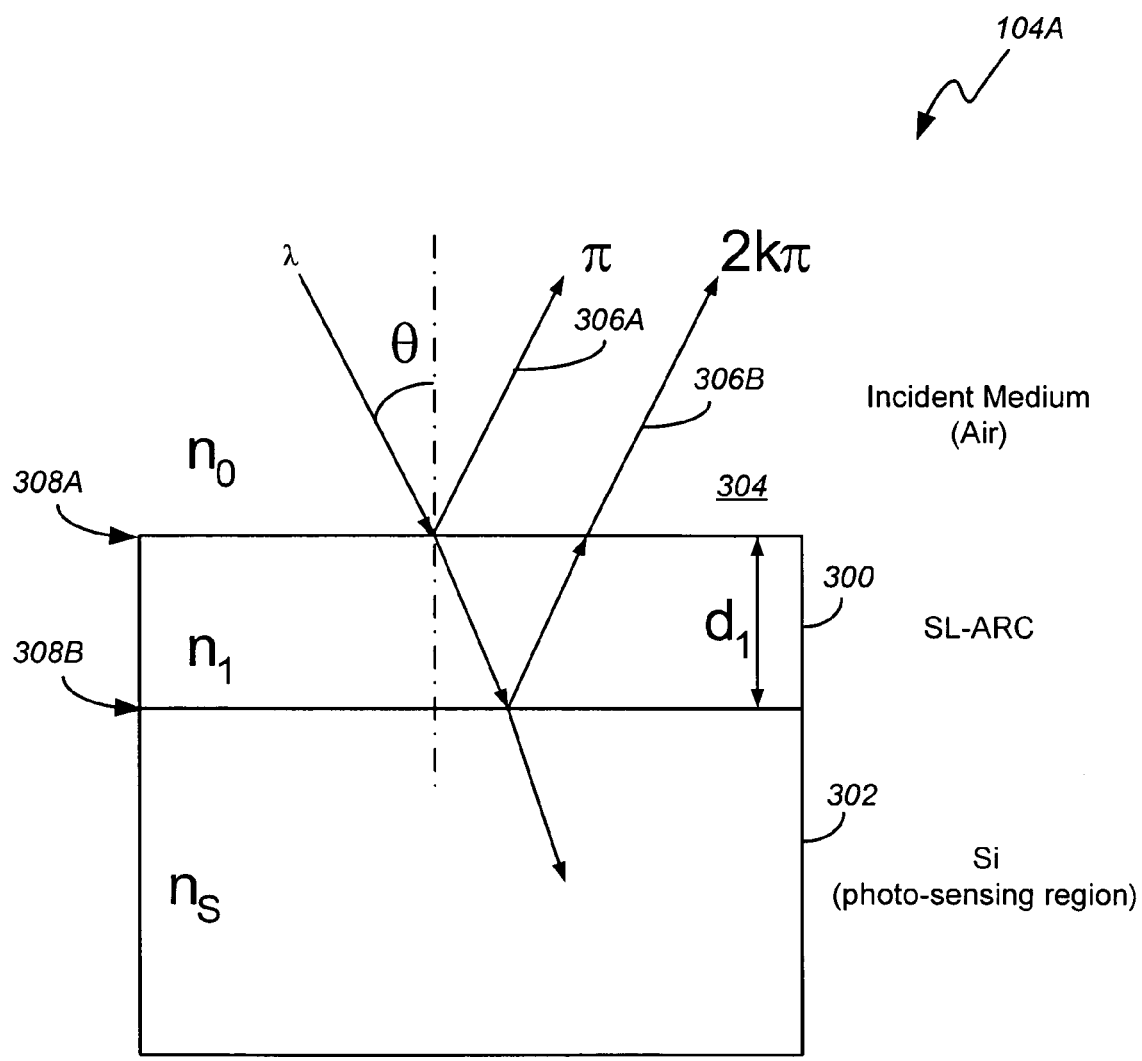
FIG. 3 illustrates a single layer of anti-reflection coating (SL-ARC) deposited on the photo-sensing region of the FIG. 1 optical navigation sensor.

Single Layer Anti-Reflection Coating for Light Emitting Diode (LED) Emitting a Wavelength of about 650 nm Referring to FIG. 3, and in one embodiment, there is shown a portion of an optical navigation sensor 104A having a single layer anti-reflection coating 300 on top of a photo-sensing region 302. Single layer anti-reflection coating 300 is also referred to herein as SL-ARC 300. A region of air 304 is the incident medium through which light is transmitted to the single layer 300. The design of single layer anti-reflection coating 300 produces two reflections 306A and 306B that interfere destructively with each other. These two reflections 306A and 306B occur between air/SL-ARC interface 308A and between SL-ARC/silicon interface 308B, respectively.

For normal incident light, i.e. light incident on the surface of interface 308A at θ=0°, the total reflectance (0≦R≦1) or reflection loss (R, in percent) may be calculated as follows:

$$R = \left[ \frac{\cos^2(\delta_1) \cdot (n_0 - n_s)^2 \cdot n_1^2 + \sin^2(\delta_1) \cdot (n_0 \cdot n_s - n_1^2)^2}{\cos^2(\delta_1) \cdot (n_0 + n_s)^2 \cdot n_1^2 + \sin^2(\delta_1) \cdot (n_0 \cdot n_s + n_1^2)^2} \right] \quad (1)$$

where $n_1$, $n_0$, $n_s$ are the refractive indices for layer 1 (i.e. the SL-ARC layer), air and silicon respectively. $\delta_1$ is the optical phase shift experienced by light in layer 300, i.e. the ARC layer, which may be calculated as follows:

$$\delta_1 = \frac{2\pi \cdot n_1 \cdot d_1}{\lambda} \quad (2)$$

where $d_1$ is the physical thickness of layer 300, and λ is the wavelength of the incident light.

Looking at FIG. 3, k is any integer, and $n_0 < n_1 < n_s$. The majority of light falls on photo-sensing region 302 at a near-zero angle of incidence, i.e. θ≈0°.

For minimum reflectance ($R_{min}$), which occurs for 90° optical phase shift, the thickness of single layer anti-reflection coating 300 should be a quarter-wavelength multiple. The thickness of single layer anti-reflection coating 300 may be calculated as follows:

$$d_{ARC} = d_1 = \frac{m \cdot \lambda}{4 n_1} \quad (3)$$

where m is any odd integer number. The minimum reflectance may be calculated as follows:

$$R_{min} = \left[ \frac{n_0 \cdot n_s - n_1^2}{n_0 \cdot n_s + n_1^2} \right]^2 \quad (4)$$

In some embodiments, the optical navigation sensor 104A may be used in optical mice having light emitting diodes (LEDs) with a wavelength of about 650 nm as their light sources. The thickness of single layer anti-reflection coating 300 may be determined using an approach described above as the light pattern to be detected falls almost normally on the photo-sensor surface, i.e., near-zero angle of incidence, θ≈0°.

In order to achieve near-zero reflection loss, the refractive index of the material for single layer anti-reflection coating 300 should be equal to the square root of the product of refractive indices of air and silicon, i.e. $\sqrt{n_0 \cdot n_s}$. Using values of refractive indices shown in TABLE-1, this ideal value for single layer anti-reflection coating 10 is 1.97, with n(Si) equal to 3.89@650 nm.

TABLE 1

| Parameters | Silicon (substrate) | SiO$_2$ | Si$_3$N$_4$ |
|---|---|---|---|
| Refractive Index (n) within 600 nm to 900 nm wavelength | 3.65 → 3.99 | 1.45 → 1.46 | 2.01 → 2.04 |
| Wavelength region of transparency | 1.1 μm → 14 μm | 200 nm → 8 μm | 290 nm → 10 μm |

TABLE 1 illustrates typical values of the refractive index and the region of transparency for silicon (Si), silicon dioxide (SiO$_2$) and silicon nitride (Si$_3$N$_4$). The value of the refractive index for each material is higher for lower wavelengths, and the refractive index of air is 1.

One good material for the anti-reflection coating 300 is silicon nitride (Si$_3$N$_4$), with refractive index values of between 2.01 and 2.04, which is very close to the ideal value. Using silicon nitride as SL-ARC 300, the minimum reflection loss at 650 nm may be as low as about 0.08%. In one embodiment, the thickness of SL-ARC 300 is a value of m×111 nm, where m is an odd integer.

In some foundry processes, direct deposition of silicon nitride on a silicon substrate may generate stress problem in the silicon nitride film itself. If the foundry can not solve this problem, silicon dioxide (SiO$_2$) is another good choice of material for single layer anti-reflection coating 300. The reflection loss at 650 nm is about 8.53%, which is a great improvement from a reflection loss of 34.9% between an interface of air and silicon without an anti-reflection coating.

TABLE 2 illustrates the thickness values of SL-ARC 300 that provide minimum reflection loss if silicon dioxide (SiO$_2$) or silicon nitride (Si$_3$N$_4$) is used for the anti-reflection coating 300.

TABLE 2

| SiO$_2$ as SL-ARC | | Si$_3$N$_4$ as SL-ARC | | |
|---|---|---|---|---|
| Thickness | R$_{min}$ (%) | Thickness | R$_{min}$ (%) | Assumptions |
| (m × 111) nm | 8.53 | (m × 80) nm | 0.08 | 650 nm light source and normal light incidence angle (i.e. θ ≈ 0°) |

Figure 4:
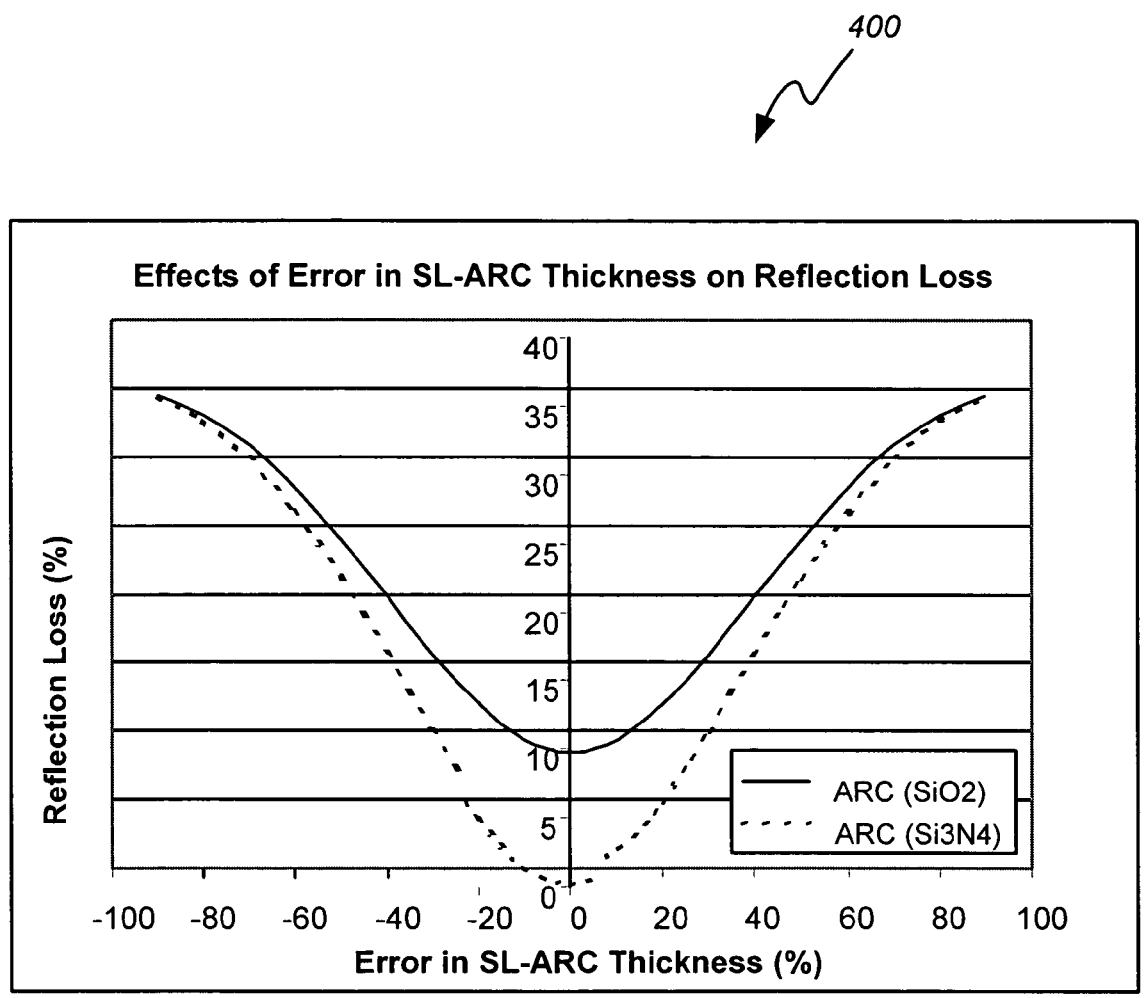
FIG. 4 illustrates the effects of 1) error in the thickness of the single layer of anti-reflection coating (SL-ARC) shown in FIG. 3 on 2) reflection loss.

FIG. 4 is a graph 400 that illustrates the effect of errors in the thickness of SL-ARC material 300 on reflection loss. The design of SL-ARC 300 may be very robust inasmuch as a thickness error as high as 20% does not greatly affect reflection loss. A 20% error may be an upper limit for error in a foundry fabrication process. For silicon nitride as SL-ARC 300, a 20% error causes less than a 5% variation in reflection loss. For silicon dioxide as SL-ARC 300, a 20% error causes less than a 12% variation in reflection loss.

Figure 5:
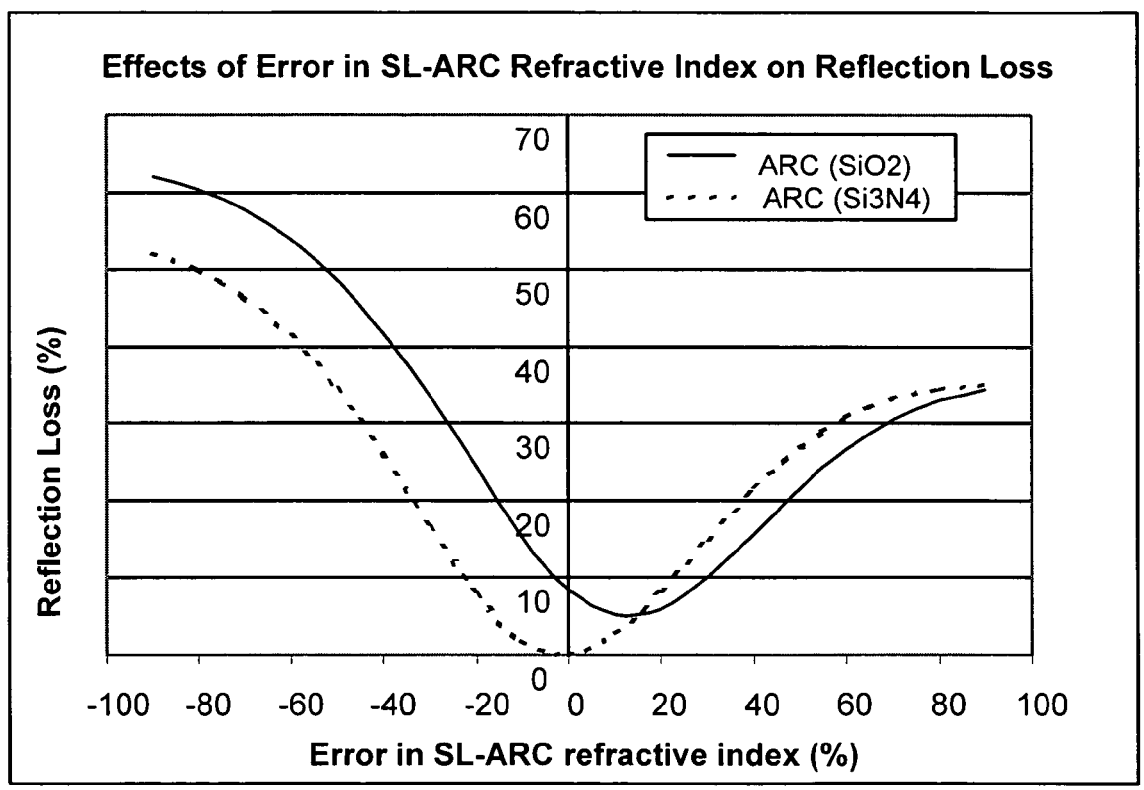
FIG. 5 illustrates the effects of 1) error in the refractive index of the single layer of anti-reflection coating (SL-ARC) shown in FIG. 3 on 2) reflection loss.

FIG. 5 is a graph 500 that illustrates the effect of errors in the refractive index of SL-ARC material 300 on reflection loss. Error in refractive index is usually small, i.e. less than 1%, and such a minor error generally causes negligible change in the reflection loss.

As shown in FIGS. 4 and 5, anti-reflection coatings can be quite robust and insensitive to variations in thickness and refractive index which might occur during wafer fabrication. As such, the performances of the anti-reflection coatings are quite consistent in terms of reflection loss reduction from wafer to wafer or from lot to lot.

Figure 6:
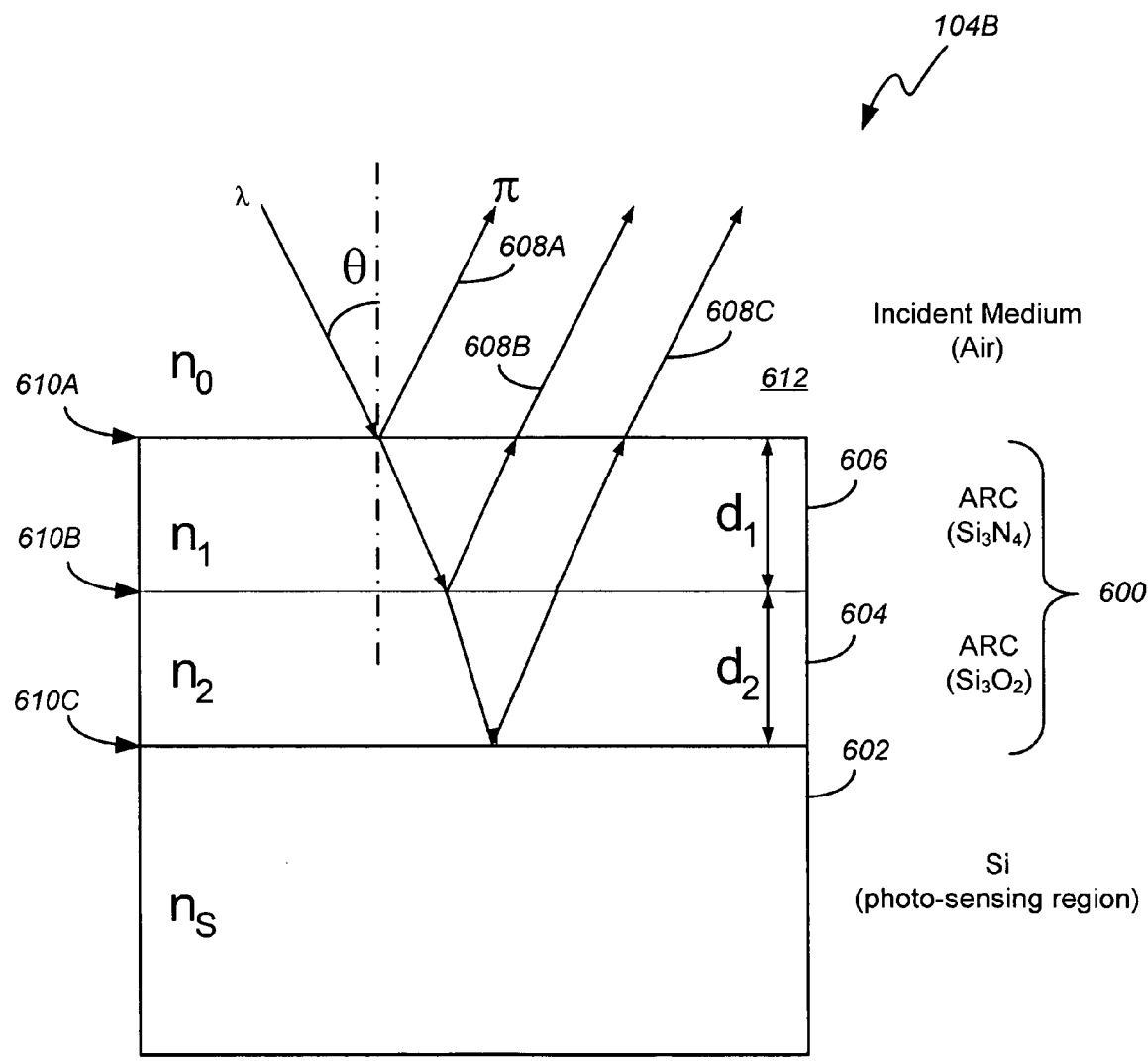
FIG. 6 illustrates a double layer of anti-reflection coating (DL-ARC) on top of the photo-sensing region of the FIG. 1 optical navigation sensor.

Double Layer Anti-Reflection Coating for Light Emitting Diode (LED) Emitting a Wavelength of about 650 nm Referring to FIG. 6, and in one embodiment, there is shown a portion of an optical navigation sensor 104B having a double layer anti-reflection coating 600 on top of a photo-sensing region 602. Double layer anti-reflection coating 600 is sometimes referred to herein as DL-ARC 600. DL-ARC 600 of optical navigation sensor 104B includes a first (or bottom) layer 604 with lower refractive index and a second (or top) layer 606 with higher refractive index. The refractive index of the top layer 606 should be selected such that the refractive index of air or another incident medium is less than the refractive index of the second layer 606, and the refractive index of the first layer 604 should be selected such that the refractive index of silicon is greater than the refractive index of the first layer 104. This can also be expressed as $n_0 < n_2 < n_1 < n_s$.

If fabrication process limitations preclude the direct deposition of silicon nitride ($Si_3N_4$) onto silicon substrate 602, and to obtain a lower reflection loss than a single layer anti-reflection coating of silicon dioxide ($SiO_2$), double layer anti-reflection coating 600 may be used. As such, bottom layer 604 is silicon dioxide ($SiO_2$) and top layer 606 is silicon nitride ($Si_3N_4$). In this case, first reflection 608A (i.e. from Air/$Si_3N_4$ interface 610A) is cancelled by interference with the two weaker reflections 608B and 608C from lower interfaces 610B and 610C, i.e. $Si_3N_4/SiO_2$ interface 610B and $SiO_2$/Si interface 610C.

The reflection loss minimas of a DL-SLC 600 are not achieved at quarter-wavelength thickness as with SL-ARC 300, but at rather arbitrary ones instead. In order to obtain near-zero reflection loss, numerical computations with an optical transfer matrix may be used to obtain the 2-dimensional dependence of the reflection loss of DL-ARC 600 with respect to both the thickness of silicon dioxide ($SiO_2$) 604 and the thickness of silicon nitride ($Si_3N_4$) 606. Using these calculations, optimum thickness values for achieving the minimum reflection loss are ascertained. For a light source, such as a light emitting diode (LED) emitting light at about 650 nm, and for a normal light incidence angle (i.e. $\theta \approx 0°$), reflection loss may be as low as about 0.0265%. Thus, by using proper thickness combinations of layers 604 and 606, a minimum reflection loss lower than the 0.08% loss offered by SL-ARC 300 of silicon nitride ($Si_3N_4$) may be achieved.

TABLE 3 illustrates the sets of ARC thickness values that may be used to achieve the above-identified reflection loss for a light source at about 650 nm, and normal light incidence angle. The thickness values of these layers are less than 500 nm. However, it is possible to provide thickness values of layers greater than 500 nm.

TABLE 3

| SET | Thickness of $Si_3N_4$ (nm) | Thickness of $SiO_2$ (nm) | Reflection Loss (%) |
|---|---|---|---|
| 1 | 100.1 | 205.9, 428.5, 651.1 | 0.0265 |
| 2 | 220.1 | 239.3, 461.9 | 0.0265 |
| 3 | 260.2 | 205.9, 428.5, 651.1 | 0.0265 |
| 4 | 380.2 | 239.3, 461.9 | 0.0265 |
| 5 | 420.3 | 205.9, 428.5, 651.1 | 0.0265 |

Single Layer Anti-Reflection Coating for Vertical Cavity Surface Emitting Laser (VCSEL) Emitting a Wavelength of about 840 nm Laser-based optical mice typically utilize Vertical Cavity Surface Emitting Lasers (VCSELs). The light output of this type of laser exhibits randomly or fixed polarization characteristics in the plane parallel to the surface of the VCSEL. In designing an anti-reflection coating for a navigation sensor that receives light initially generated by a VCSEL (and then reflected from a surface), s-polarized incident light may be assumed.

The effectiveness of an anti-reflection coating is sensitive to parameters such as layer thicknesses, refraction indices of ARC material(s), angle of light incidence and wavelength of operation. For a laser based optical mouse, the VCSEL usually operates in the near-infrared range of about 840 nm wavelength, and the laser light beam hits the surface at an angle of approximately 210 to the tracking surface. From a packaging point of view, and in order to avoid the tilting angle error that would affect manufacturing yield, the navigation sensor may be placed such that it is parallel to the tracking surface. From the basic law of reflection, the angle of incidence for light signals that fall on the navigation sensor's photo-sensing regions is approximately 21°.

Figure 7:
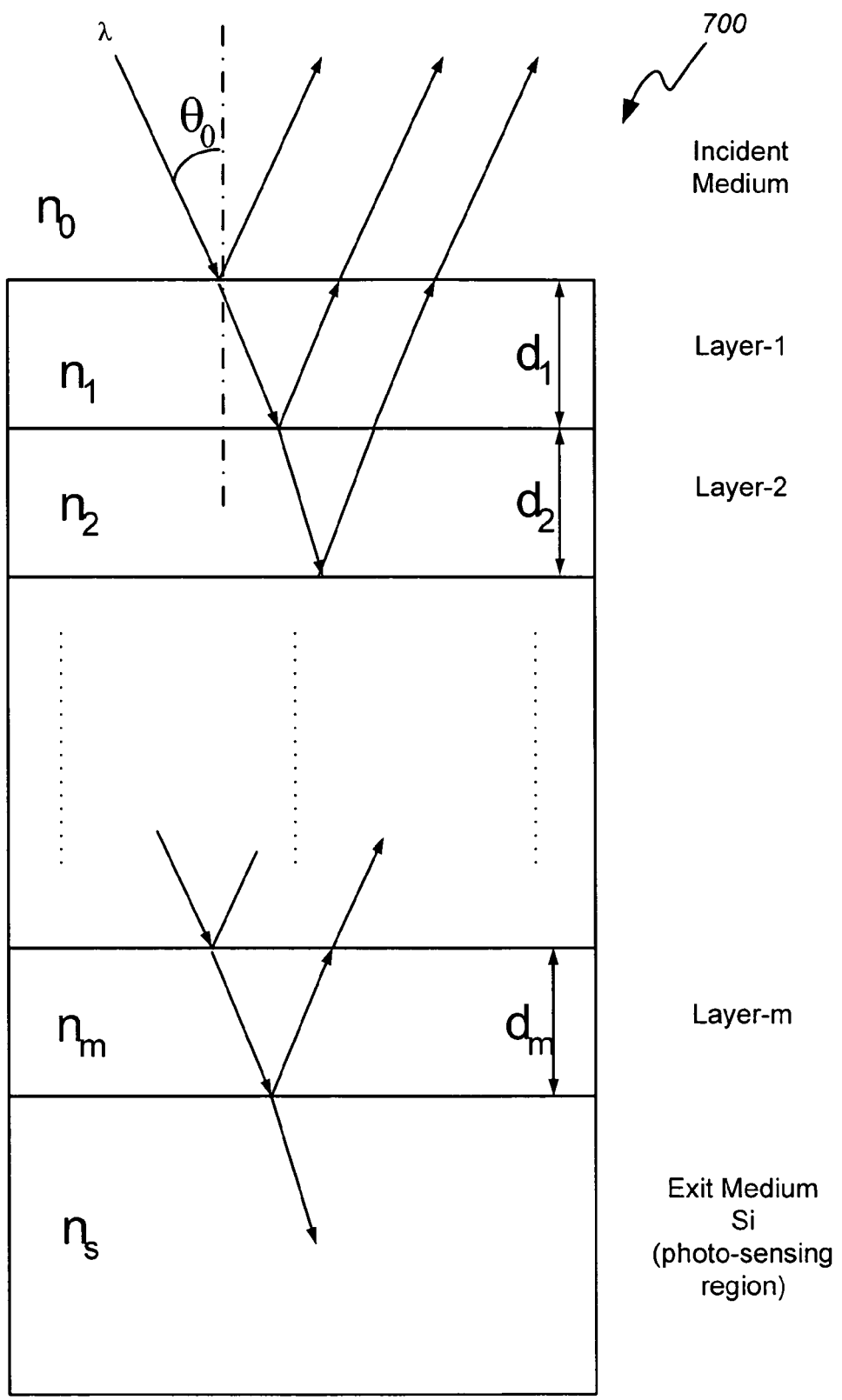
FIG. 7 illustrates a multilayer thin-film anti-reflection coating.

Looking at FIG. 7, there is shown a multilayer thin-film anti-reflection coating system 700. The light reflection loss from multilayer thin-film anti-reflection coating system 700 can be determined by using a transfer matrix. Each layer may be represented by a 2×2 matrix $M_i$ whereby:

$$M_i = \begin{bmatrix} \cos\delta_i & \dfrac{j\sin\delta_i}{\eta_i} \\ j\eta_i \sin\delta_i & \cos\delta_i \end{bmatrix} \quad (5)$$

where $\delta$ is the optical phase change experienced by light in the layer and is given by:

$$\delta_1 = \frac{2\pi \cdot n_i \cdot d_i}{\lambda} \cos\theta_i \quad (6)$$

and $n_i$ is the refractive index of the coating material, $d_i$ is the physical layer thickness and $\lambda$ is the light wavelength. The light angle in the layer ($\theta_i$), is related to the angle of incidence ($\theta_0$) by the Snell's Law:

$$n_i \sin\theta_i = n_0 \sin\theta_0 \quad (7)$$

For s-polarized (TE) incident light, the optical admittance ($\eta_i$) of the coating layer is given by:

$$\eta_{i,x} = n_i \cos\theta_i \quad (8)$$

while those of p-polarized (TM) incident light is given by:

$$\eta_{i,p} = \frac{n_i}{\cos\theta_i} \quad (9)$$

The reflection coefficient (ρ) of the whole multilayer structure is then given by:

$$\rho = \frac{\eta_0 - \frac{C}{B}}{\eta_0 + \frac{C}{B}} \quad (10)$$

where the coefficients B and C could be determined from the following multilayer characteristic matrix of m- number of layers:

$$\begin{bmatrix} B \\ C \end{bmatrix} = M_1 \cdot M_2 \cdots M_m \cdot \begin{bmatrix} 1 \\ \eta_s \end{bmatrix} \quad (11)$$

Finally, the reflection loss (R) from a multi-layer ARC coating can be obtained from the equation:

$$R = \rho \cdot \rho^* \quad (12)$$

where ρ* is the complex conjugate of ρ.

For a cost-effective integration of an anti-reflection coating with an optical navigation sensor in a CMOS/BICMOS platform, at most two layers of ARC should be used. However, it is sometimes possible to use more than two layers of anti-reflection coating may be used. Also, the choice of the thin film material may be limited to silicon nitride ($Si_3N_4$) and silicon dioxide ($SiO_2$), two dielectric materials that are commonly used in MOS fabrications. Silicon nitride ($Si_3N_4$) and silicon dioxide ($SiO_2$) can be easily deposited by plasma-enhanced chemical vapor deposition (PECVD) or grown by CVD. Values of the refractive indices for silicon, silicon dioxide and silicon nitride at a wavelength of about 840 nm are given in TABLE 4. This wavelength may vary by approximately ±20 nm, from 820 nm to 860 nm. A wavelength of 840 nm is a typical lasing wavelength of a VCSEL used in a laser based optical mouse. In addition to silicon dioxide and silicon nitride, other silicon-based materials may be used, such as spin-on-glass-oxynitrides, silicon-oxynitrides, polyimide thin films and other materials compatible with MOS processing.

TABLE 4

| Parameters | Silicon (epi/substrate) | $SiO_2$ | $Si_3N_4$ |
|---|---|---|---|
| Refractive Index (n) at wavelength of 840 nm ± 20 nm | 3.68 | 1.46 | 2.02 |

Figure 8:
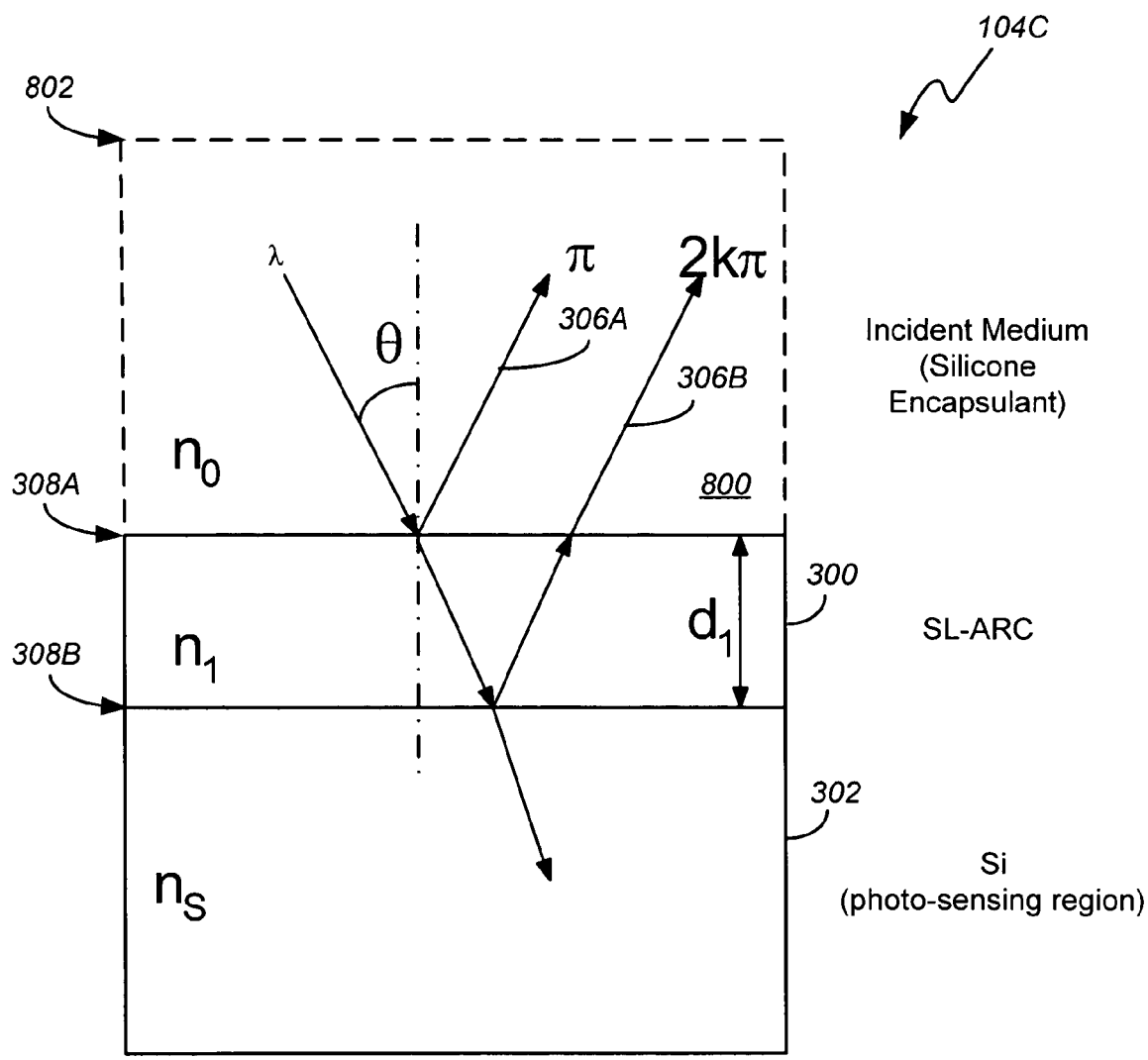
FIG. 8 illustrates a single layer of anti-reflection coating (SL-ARC) on top of the photo-sensing region of the optical navigation sensor shown in FIG. 1, together with a silicone encapsulant deposited on the single layer of anti-reflection coating (SL-ARC)

As shown in FIGS. 3 and 8, a single layer anti-reflection coating 300 produces two reflections 306A and 306B that interfere destructively with each other. These two reflections 306A and 306B occur at incident medium/SL-ARC interface 308A and at SL-ARC/silicon interface 308B, respectively. Using the transfer matrix numerical calculations described above, TABLE 5 provides values for the minimum reflection losses obtained by a silicon dioxide ($SiO_2$) or silicon nitride ($Si_3N_4$) SL-ARC 300, which may be applied on silicon substrate 302 of the optical navigation sensor 104A or 104C of a laser based optical mouse. The values provided in TABLE 5 are for an s-polarized light source with a wavelength of about 840 nm, and a light incidence angle of about 21°. The refractive index of silicone is about 1.41 at a wavelength of about 840 nm.

TABLE 5

| | $SiO_2$ as SL-ARC | | $Si_3N_4$ as SL-ARC | |
|---|---|---|---|---|
| Incident Medium | Thickness (nm) | $R_{min}$ (%) | Thickness (nm) | $R_{min}$ (%) |
| Air | 445.9 | 6.82 | 317.1 | 0.52 |
| Silicone | 460.3 | 19.16 | 322.3 | 1.27 |

The minimum reflection loss values and the thickness values for anti-reflection coating 300 are for an incident angle of 21° with an incident medium of air 304 (FIG. 1) and with an incident medium of silicone layer 800 (FIG. 8). Silicone layer 800 may be used as an encapsulant material for navigation sensor 302 (and anti-reflection coating 300). Silicon layer 800 typically has a great enough thickness, such as over 10 µm, to be considered a thick film. As a result, interference effects may be disregarded in this layer, and the small reflection loss at the air/silicone interface 802, which may be about 4%, typically does not need to be taken into account.

Figure 9:
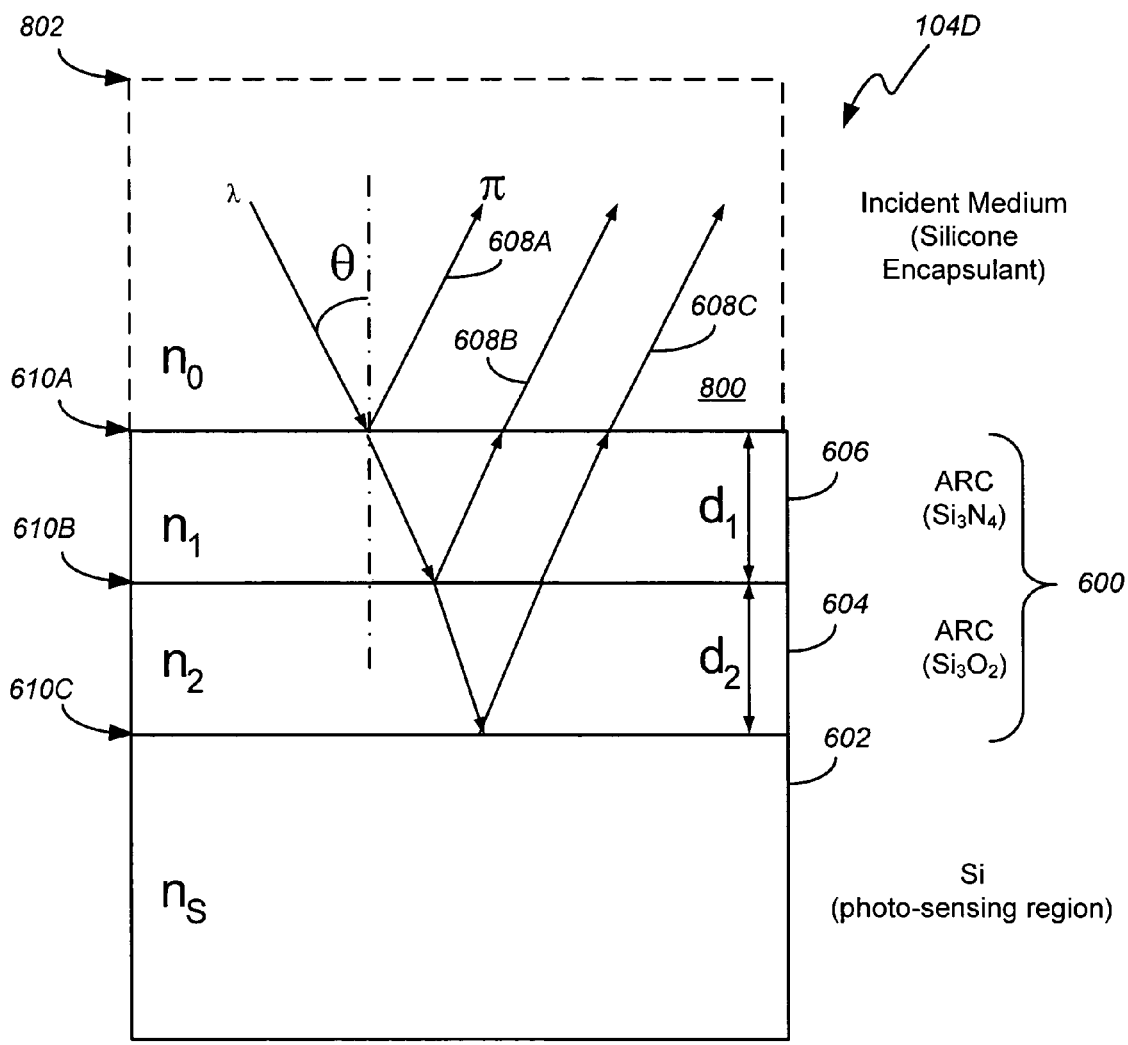
FIG. 9 illustrates a double layer of anti-reflection coating (DL-ARC) on top of the photo-sensing region of the optical navigation sensor shown in FIG. 1, together with a silicone encapsulant deposited on the double layer of anti-reflection coating (DL-ARC).

Double Layer Anti-Reflection Coating for Vertical Cavity Surface Emitting Laser (VCSEL) With a Wavelength of about 840 nm Referring to FIGS. 6 and 9, there are shown exemplary portions of optical navigation sensors 104B, 104D having double layer anti-reflection coatings 600 deposited on their photo-sensing regions 602. Double layer anti-reflection coating 600 is sometimes referred to below as DL-ARC 600. DL-ARC 600 of optical navigation sensors 104B, 104D includes a first (or bottom) layer 604 with a lower refractive index, and a second (or top) layer 606 with a higher refractive index. The refractive index of the top layer 606 should be selected such that the refractive index of air or another incident medium 800 is less than the refractive index of the second layer 606, and the refractive index of the first layer 604 should be selected such that the refractive index of silicon is greater than the refractive index of the first layer 104. This can also be expressed as $n_0 < n_2 < n_1 < n_s$.

If fabrication process limitations preclude the direct deposition of silicon nitride ($Si_3N_4$) onto silicon substrate 602, and to obtain a lower reflection loss than a single layer anti-reflection coating of silicon dioxide ($SiO_2$), double layer anti-reflection coating 600 may be used. As such, bottom layer 604 is silicon dioxide ($SiO_2$) and top layer 606 is silicon nitride ($Si_3N_4$). In this case, first reflection 608A (i.e. from Air/$Si_3N_4$ interface 610A) is cancelled by interference with the two weaker reflections 608B and 608C from lower interfaces 610B and 610C, i.e. $Si_3N_4/SiO_2$ interface 610B and $SiO_2$/Si interface 610C.

As described above, reflection loss minimas of a DL-SLC 600 are not achieved at quarter-wavelength thickness as with SL-ARC 300, but are rather at arbitrary thicknesses. In order to obtain near-zero reflection loss, numerical computations with an optical transfer matrix are used to obtain the 2-dimensional dependence of the reflection loss of DL-ARC 600 with respect to both the thickness of silicon dioxide ($SiO_2$) 602 and the thickness of silicon nitride ($Si_3N_4$) 604. Using these calculations, optimum thickness values for achieving the minimum reflection loss are ascertained. For a light source such as a vertical cavity surface emitting laser (VCSEL) at about 840 nm, a light incidence angle of 21°, and an incident medium of air 612 (FIG. 6), reflection loss may be as low as about 0.0036%.

The values provided in TABLE 6 are for an s-polarized light source with a wavelength of about 840 nm and a light incidence angle of about 21°. The refractive index of silicone 800 (FIG. 9) is about 1.41 at a wavelength of about 840 nm. The minimum reflection loss values and the thickness values for anti-reflection coating 300 are for an incident angle of 21° with an incident material of air 20 (FIG. 6) and with an incident material of silicone layer 800 (FIG. 9).

TABLE 6

| Incident Medium | $Si_3N_4$ Thickness (nm) | $SiO_2$ Thickness (nm) | $R_{min}$ (%) |
| --- | --- | --- | --- |
| Air | 145.5 | 1150.7 | 0.0036 |
| Silicone | 535.4 | 920.5 | 1.2767 |

Silicone layer 800 (FIG. 9) may be used as an encapsulant material for navigation sensor 602 (and anti-reflection coating 600). Silicon layer 800 typically has a great enough thickness, such as over 10 μm, to be considered a thick film. As a result, interference effects may be disregarded in this layer, and the small reflection loss at the air/silicone interface 802, which may be about 4%, typically does not need to be taken into account.

The optical navigation devices with various anti-reflection coatings, as described above, may be manufactured, in one way, by providing a silicon wafer having a plurality of optical navigation sensors formed thereon, wherein each of the optical navigation sensors has a plurality of photo-sensing regions, and wherein each of the photo-sensing regions provides a pixel of navigation information. At least one layer of material may then be deposited on the photo-sensing regions of the silicon substrate during a silicon wafer fabrication process. Each of the at least one layer of material may have a thickness that causes the layer of material to serve as an anti-reflection coating and reduce a percentage of light that is reflected away from the photo-sensing regions of the silicon substrate to less than 30%. After depositing the layers of material, each of the optical navigation sensors may be separated from the wafer. Thereafter, a light source and one of the optical navigation sensors may be mounted within an optical navigation device, with the light source and the one of the optical navigation sensors being positioned to enable light produced by the light source to be reflected from a surface and received by the one of the optical navigation sensors. The one of the optical navigation sensors may also be coupled to a circuit to bias each of its photo-sensing regions with a current. The current is selected to provide a given responsivity, with the current being less than a current that would be required to provide the same responsivity absent the at least one layer of material.

In one embodiment of the above-described method, at least one of the layers of material, and preferably all of them, is deposited using a mask. The same mask may be used to define the photo-sensing regions of the silicon substrate. Also, at least one of the layers of material, and preferably all of them, is deposited using a standard CMOS/BICMOS deposition technique, such as chemical vapor deposition (CVD) or plasma-enhanced CVD (PECVD).

What is claimed is:

1. An optical navigation device, comprising:
   a light source to produce light for illuminating a surface;
   an optical navigation sensor to receive light reflected from the surface, the light reflected from the surface being initially produced by the light source, and the optical navigation sensor having:
   a silicon substrate having a plurality of photo-sensing regions, each of which receives a portion of the light reflected from the surface, and each of which provides a pixel of navigation information;
   at least one layer of material that was deposited on the photo-sensing regions of the silicon substrate during a silicon wafer fabrication process, wherein each of the at least one layer of material has a thickness that causes the layer of material to serve as an anti-reflection coating and reduce a percentage of light that is reflected away from the photo-sensing regions of the silicon substrate to less than 30%; and
   a circuit to bias each of the photo-sensing regions with a current, the current providing a given responsivity, and the current being less than a current that would be required to provide the given responsivity absent the at least one layer of material.

2. The optical navigation device of claim 1, wherein the photo-sensing regions provide the optical navigation sensor with a given resolution, the given resolution being greater than would be possible to achieve while maintaining the given responsivity in the absence of the at least one layer of material.

3. The optical navigation device of claim 1, wherein each of the at least one layer of material is selected from the group consisting of: silicon nitride, silicon dioxide, spin-on-glass-oxynitrides, silicon-oxynitrides, and a polyimide thin films.

4. The optical navigation device of claim 1, wherein the at least one layer of material is a single layer of silicon nitride.

5. The optical navigation device of claim 4, wherein the light source is a light emitting diode, wherein the wavelength of the light is about 650 nm, wherein the light with respect to the photo-sensing region of the silicon substrate has a normal incidence angle of about 0°, wherein the thickness of the single layer of silicon nitride is about 64 nm to about 96 nm multiplied by an odd integer, and wherein the thickness of the single layer of silicon nitride provides a minimum reflection loss of less than 5%.

6. The optical navigation device of claim 4, wherein the light source is a light emitting diode, wherein the wavelength of the light is about 650 nm, wherein the light with respect to the photo-sensing region of the silicon substrate has a normal incidence angle of about 0°, wherein the thickness of the single layer of silicon nitride is about 80 nm multiplied by an odd integer, and wherein the thickness of the single layer of silicon nitride provides a minimum reflection loss of about 0.08%.

7. The optical navigation device of claim 4, wherein the light source is a VCSEL, wherein the wavelength of the light is about 840 nm, wherein the light with respect to the photo-sensing region of the silicon substrate has an incidence angle of about 21°, wherein the thickness of the single layer of silicon nitride is about 317.1 nm, and wherein the thickness of the single layer of silicon nitride provides a minimum reflection loss of about 0.52%.

8. The optical navigation device of claim 1, wherein the at least one layer of material is a single layer of silicon dioxide.

9. The optical navigation device of claim 8, wherein the light source is a light emitting diode, wherein the wavelength of the light is about 650 nm, wherein the light with respect to the photo-sensing region of the silicon substrate has a normal incidence angle of about 0°, wherein the thickness of the single layer of silicon dioxide is about 88.8 nm to about 133.2 nm multiplied by an odd integer, and wherein the thickness of the single layer of silicon dioxide provides a minimum reflection loss of less than 12%.

10. The optical navigation device of claim 8, wherein the light source is a light emitting diode, wherein the wavelength of the light is about 650 nm, wherein the light with respect to the photo-sensing region of the silicon substrate has a normal incidence angle of about 0°, wherein the thickness of the single layer of silicon nitride is about 111 nm multiplied by an odd integer, and wherein the thickness of the single layer of silicon dioxide provides a minimum reflection loss of about 8.53%.

11. The optical navigation device of claim 8, wherein the light source is a VCSEL, wherein the wavelength of the light is about 840 nm, wherein the light with respect to the photo-sensing region of the silicon substrate has an incidence angle of about 21°, wherein the thickness of the single layer of silicon nitride is about 445.9 nm, and wherein the thickness of the single layer of silicon dioxide provides a minimum reflection loss of about 6.82%.

12. The optical navigation device of claim 1, wherein the at least one layer of material is formed by a first layer and a second layer, and wherein the first layer and the second layer comprise different materials from one another.

13. The optical navigation device of claim 12, wherein the first layer is silicon dioxide, and wherein the second layer is silicon nitride.

14. The optical navigation device of claim 13, wherein the first layer forms an interface on the photo-sensing region of the silicon substrate, and wherein the second layer forms an interface on the first layer.

15. The optical navigation device of claim 14, wherein the first layer of silicon dioxide has a thickness and the second layer of silicon nitride has a thickness, and wherein the thicknesses of the first layer and the second layer provide a minimum reflection loss of about 0.0265%.

16. The optical navigation device of claim 15, wherein the light source is a light emitting diode, wherein the wavelength of the light is about 650 nm, wherein the light with respect to the photo-sensing region of the silicon substrate has a normal incidence angle of about 0°, wherein the thickness of the first layer of silicon dioxide is about 100.1 nm, and wherein the thickness of the second layer of silicon nitride is one selected from the group consisting of about 205.9 nm, about 428.5 nm, and about 651.1 nm.

17. The optical navigation device of claim 15, wherein the light source is a light emitting diode, wherein the wavelength of the light is about 650 nm, wherein the light with respect to the photo-sensing region of the silicon substrate has a normal incidence angle of about 0°, wherein the thickness of the first layer of silicon dioxide is about 220.1 nm, and wherein the thickness of the second layer of silicon nitride is one selected from the group consisting of about 239.3 nm and about 461.9 nm.

18. The optical navigation device of claim 15, wherein the light source is a light emitting diode, wherein the wavelength of the light is about 650 nm, wherein the light with respect to the photo-sensing region of the silicon substrate has a normal incidence angle of about 0°, wherein the thickness of the first layer of silicon dioxide is about 260.2 nm, and wherein the thickness of the second layer of silicon nitride is one selected from the group consisting of about 205.9 nm, about 428.5 nm, and about 651.1 nm.

19. The optical navigation device of claim 15, wherein the light source is a light emitting diode, wherein the wavelength of the light is about 650 nm, wherein the light with respect to the photo-sensing region of the silicon substrate has a normal incidence angle of about 0°, wherein the thickness of the first layer of silicon dioxide is about 380.2 nm, and wherein the thickness of the second layer of silicon nitride is one selected from the group consisting of about 239.3 nm and about 461.9 nm.

20. The optical navigation device of claim 15, wherein the light source is a light emitting diode, wherein the wavelength of the light is about 650 nm, wherein the light with respect to the photo-sensing region of the silicon substrate has a normal incidence angle of about 0°, wherein the thickness of the first layer of silicon dioxide is about 420.3 nm, and wherein the thickness of the second layer of silicon nitride is one selected from the group consisting of about 205.9 nm, about 428.5 nm, and about 651.1 nm.

21. The optical navigation device of claim 14, wherein the light source is a VCSEL, wherein the wavelength of the light is about 840 nm, wherein the light with respect to the photo-sensing region of the silicon substrate has an incidence angle of about 21°, wherein the thickness of the first layer of silicon dioxide is about 1150.7 nm, wherein the thickness of the second layer of silicon nitride is about 145.5 nm, and wherein the thicknesses of the first and second layers provide a minimum reflection loss of about 0.0036%.

22. The optical navigation device of claim 14, further comprising a silicone encapsulation material disposed on the second layer of silicon nitride, wherein the light source is a VCSEL, wherein the wavelength of the light is about 840 nm, wherein the light with respect to the photo-sensing region of the silicon substrate has an incidence angle of about 21°, wherein the thickness of the first layer of silicon dioxide is about 920.5 nm, wherein the thickness of the second layer of silicon nitride is about 535.4 nm, and wherein the thicknesses of the first and second layers provide a minimum reflection loss of about 0.0036%.

23. The optical navigation device of claim 1, wherein the light source is a VCSEL, wherein the wavelength of the light is about 840 nm, wherein the light with respect to the photo-sensing region of the silicon substrate has an incidence angle of about 21°, wherein the at least one layer of material is a single layer of silicon nitride, wherein the optical navigation device further comprises a silicone encapsulation material disposed on the single layer of silicon nitride, wherein the thickness of the single layer of silicon nitride is about 322.3 nm, and wherein the thickness of the single layer of silicon nitride provides a minimum reflection loss of about 1.27%.

24. The optical navigation device of claim 1, wherein the light source is a VCSEL, wherein the wavelength of the light is about 840 nm, wherein the light with respect to the photo-sensing region of the silicon substrate has an incidence angle of about 21°, wherein the at least one layer of material is a single layer of silicon dioxide, wherein the optical navigation device further comprises a silicone encapsulation material disposed on the single layer of silicon dioxide, wherein the thickness of the single layer of silicon dioxide is about 460.3 nm, and wherein the thickness of the single layer of silicon dioxide provides a minimum reflection loss of about 19.16%.

25. A method for manufacturing an optical navigation device, comprising:
provided a silicon wafer having a plurality of optical navigation sensors formed thereon, wherein each of the optical navigation sensors has a plurality of photo-sensing regions, and wherein each of the photo-sensing regions provides a pixel of navigation information;
depositing at least one layer of material on the photo-sensing regions of the silicon substrate during a silicon wafer fabrication process, wherein each of the at least one layer of material has a thickness that causes the layer of material to serve as an anti-reflection coating and reduce a percentage of light that is reflected away from the photo-sensing regions of the silicon substrate to less than 30%;

separating each of the optical navigation sensors from the wafer;

mounting a light source and one of the optical navigation sensors in an optical navigation device, with the light source and the one of the optical navigation sensors being positioned to enable light produced by the light source to be reflected from a surface and received by the one of the optical navigation sensors; and coupling the one of the optical navigation sensors to a circuit to bias each of its photo-sensing regions with a current, the current providing a given responsivity, and the current being less than a current that would be required to provide the given responsivity absent the at least one layer of material.

26. The method of claim 25, further comprising, selecting each of the at least one material from the group consisting of: silicon nitride, silicon dioxide, spin-on-glass-oxynitrides, silicon-oxynitrides, and polyimide thin films.

27. The method of claim 25, wherein at least one of the layers of material is deposited using a mask, the mask also being used to define the photo-sensing regions of the silicon substrate.

28. The method of claim 25, further comprising depositing a silicone encapsulant on the at least one layer of material.

29. The method of claim 25, wherein the at least one layer of material is deposited using a standard CMOS/BICMOS deposition technique.

* * * * *